Patented Nov. 7, 1950

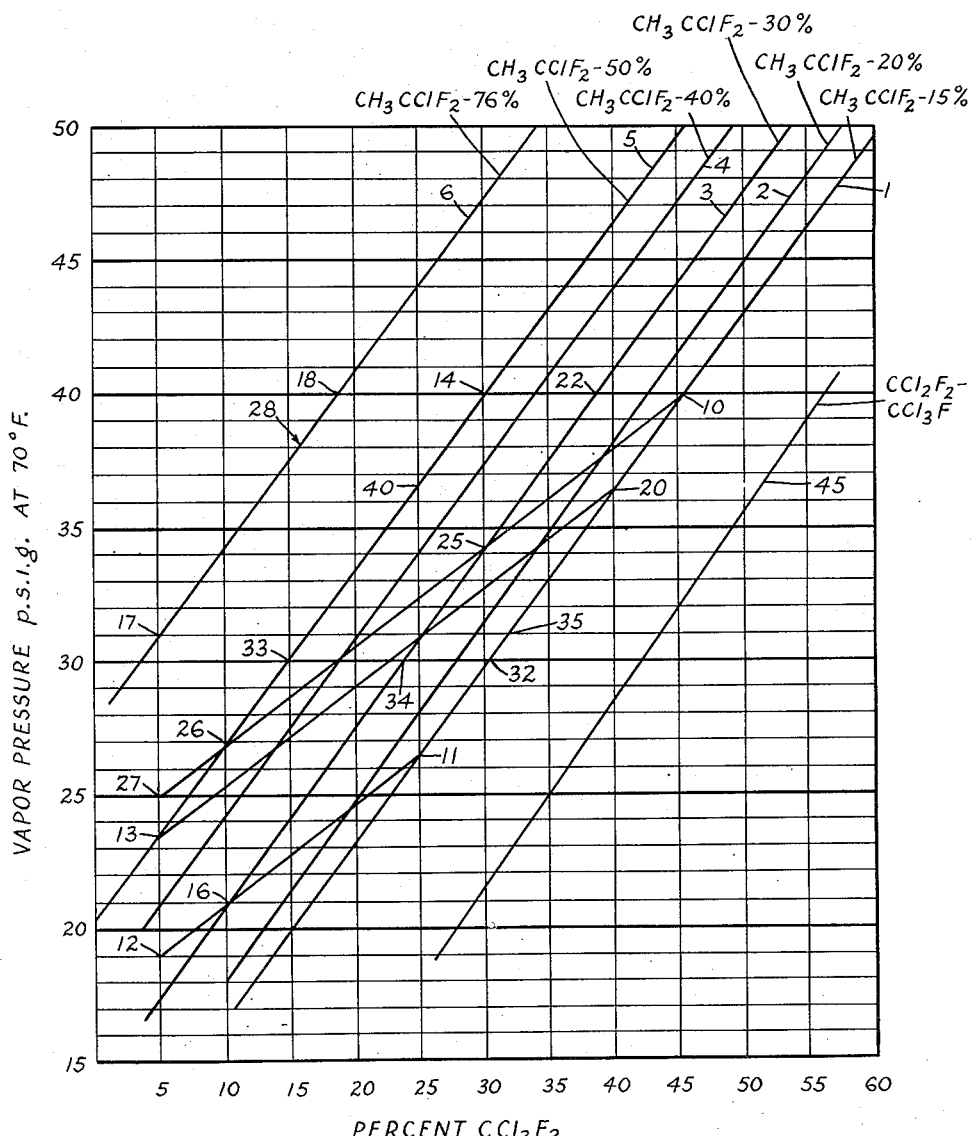

2,529,092

UNITED STATES PATENT OFFICE 2,529,092

LIQUEFIED GAS PROPELLANT COMPOSITIONS

Frederick G. Lodes, Yonkers, N. Y., assignor to Allied Chemical & Dye Corporation, New York, N. Y., a corporation of New York Application November 26, 1948, Serial No. 61,999

8 Claims. (Cl. 252—305)

This invention relates to non-flammable, non-toxic liquefied gas compositions, adapted for use as dispersants, and particularly for use in the manufacture of so-called low pressure aerosol insecticidal products.

Utilization as dispersants of several low boiling compounds and mixtures thereof has been proposed. Such dispersant compounds or mixtures may be grouped in two general classes: namely, high pressure dispersants, i. e. those liquid compositions having vapor pressures of more than about 40 p. s. i. g. at about room temperature; and low pressure dispersants, i. e. those having vapor pressures of less than about 40 p. s. i. g. at about room temperature, the 40 p. s. i. g. maximum for low pressure dispersants being set by current governmental regulations. Of the two groups, low pressure dispersants have become of increasing greater commercial importance because their low pressure characteristics are essential features of the dispersants used in the production of low pressure "aerosol bombs" now employed widely particularly for household purposes. The principal requirements for a low pressure dispersant are that it possesses non-flammable and non-toxic properties, has a vapor pressure appreciably below 40 p. s. i. g. at room temperature, and that it be of such composition as to contain a relatively large amount of dispersant material which is volatile, and exists as a gas at room temperature.

Two compounds used in admixture to a substantial commercial extent in the low pressure dispersant field are dichlorodifluoromethane ($CCl_2F_2$) and trichlorofluoromethane ($CCl_3F$). The former boils at minus 29.2° C. and has a vapor pressure at room temperature of about 70 p. s. i. g., while trichlorofluoromethane boils at 23.9° C. but has no effective vapor pressure at room temperature. Both compounds are non-flammable and non-toxic, and hence mixtures of such materials satisfy these two major requirements. However, the room temperature vapor pressure of dichlorodifluoromethane is much too high to permit use of this compound alone as a low pressure dispersant. Hence, it has been the practice to formulate various mixtures of dichlorodifluoromethane and trichlorofluoromethane in proportions such that the vapor pressure at room temperature of such mixtures is low enough to permit use as a low pressure dispersant. The only part of these dispersant mixtures which is an active ingredient in an aerosol sense is the volatile matter content, i. e. the dichlorodifluoromethane constituent which is a gas at room temperature. In the aerosol dispersant art and in the present specification and claims, the expression "volatile matter" designates constituents which exist as gases at room temperature. Thus in commercial mixtures of trichlorofluoromethane and dichlorodifluoromethane, the only volatile matter material is the dichlorodifluoromethane, the trichlorofluoromethane is non-volatile and functions primarily as a pressure depressant.

The higher the volatile matter content of an aerosol dispersant, the more desirable is the dispersant for the purposes indicated. In commercial mixtures of trichlorofluoromethane and dichlorodifluoromethane, in order to bring down the room temperature vapor pressure to or below the current allowable maximum of 40 p. s. i. g., it is necessary to incorporate a relatively large quantity of trichlorofluoromethane. The greater the amount of trichlorofluoromethane, the less is the permissible maximum of the volatile dichlorodifluoromethane. For example, in a representative commercial dichlorodifluoromethane-trichlorofluoromethane mixture, sufficient trichlorofluoromethane is utilized to bring the room temperature vapor pressure of the mixture down to about 36 p. s. i. g., the latter value being adopted to provide a relatively large factor of safety in the filling of the aerosol containers commonly referred to in the lower pressure field as the "beer can" type. A mixture of the foregoing nature contains by weight about 50% trichlorofluoromethane and 50% dichlorodifluoromethane, and it will be seen that in order to provide a dispersant having a given vapor pressure, the volatile matter content of the mixture is limited, i. e. as instanced, to a maximum of 50% of the total composition. In some circumstances, the vapor pressure of a low pressure dispersant might be raised to say 37–39 p. s. i. g., in which situation, the dichlorodifluoromethane volatile matter content may be increased to some small extent. However, such volatile matter increase is so small as to be of little practical importance. On the other hand, it will be understood that in the manufacture of dispersants having vapor pressures at room temperature decreasingly less than say 36 p. s. i. g., it is necessary to progressively increase the trichlorofluoromethane content in order to bring down the pressure, the result being a corresponding decrease of the volatile matter content of the lower pressure mixtures.

The object of this invention is to provide low pressure, liquid dispersant compositions which are non-flammable, non-toxic, and have volatile matter contents which are greater than the volatile matter contents of prior commercially employed low pressure dispersants, e. g. mixtures of dichlorodifluoromethane and trichlorofluoromethane, having corresponding room temperature vapor pressure values. Further, the invention aims to afford liquid dispersant compositions which because of their non-flammable, non-toxic, and high volatile matter content characteristics are especially adapted for use in the manufacture of low pressure insecticidal aerosols suitable particularly for household purposes.

According to this invention, it has been found that the incorporation into a mixture of dichlorodifluoromethane and trichlorofluoromethane of any amount of 1,1,1-difluorochloroethane ($CH_3CClF_2$) provides a low pressure dispersant which has, for any given or required vapor pressure, a higher volatile matter content than the volatile matter content of mixtures of dichlorodifluoromethane and trichlorofluoromethane having the same vapor pressure value. The 1,1,1-difluorochloroethane is a non-toxic, slightly flammable material boiling at minus 9.2° C., and having a vapor pressure of 30.2 p. s. i. g. and a specific gravity of 1.12 at 70° F. This material exists as a gas at room temperature, and hence in the aerosol sense is "volatile matter." I find that the inherent properties of 1,1,1-difluorochloroethane are such that so great an amount of 1,1,1-difluorochloroethane may be incorporated into mixtures of dichlorodifluoromethane and trichlorofluoromethane as to result in the formation of low pressure dispersants having volatile matter contents which are substantially higher than the highest permissible volatile matter content of commercially feasible dichlorodifluoromethane - trichlorofluoromethane mixtures having vapor pressures of 40 p. s. i. g. or less at 70° F. Moreover, I have found that the inherent properties of 1,1,1-difluorochloroethane are such that so great amounts of 1,1,1-difluorochloroethane may be incorporated into mixtures of dichlorodifluoromethane and trichlorofluoromethane as to result in the formation of low pressure dispersants containing preferably 50% and more by weight of 1,1,1-difluorochloroethane, and having low "distillation effects," and having volatile matter contents, preferably not less than 60% by weight, far in excess of the highest possible volatile matter content of commercially feasible dichlorodifluoromethane-trichlorofluoromethane mixtures having vapor pressures at or below 40 p. s. i. g. at 70° F.

The compositions of the invention consist of 1, 1, 1 - difluorochloroethane, dichlorodifluoromethane, and trichlorofluoromethane. The relative proportioning of these materials depends upon sought-for characteristics, principally vapor pressure and volatile matter content of the finished products. In their broader aspects, the improved dispersant compositions consist of the three compounds indicated, and contain by weight not less than about 15% and not more than about 76% of 1,1,1-difluorochloroethane, not more than about 45% and not less than about 5% of dichlorodifluoromethane, the remainder, to provide a 100% composition, being trichlorofluoromethane. In these compositions, it will be understood that, for any given vapor pressure, the greater the 1,1,1-difluorochloroethane content, the less are the amounts of dichlorodifluoromethane and trichlorofluoromethane.

All of the compositions included in the stated content ranges are so constituted as to have vapor pressures in the range of about 18–19 to about 40 p. s. i. g. at 70° F. In making up compositions containing as little as about 15% by weight of 1,1,1-difluorochloroethane, such composition should contain not more than about 45% dichlorodifluoromethane in order to keep the vapor pressure at 70° F. at about or below 40 p. s. i. g. In this instance, the trichlorofluoromethane content is about 40%, it being noted that in this particular composition the total volatile matter content of 1,1,1-difluorochloroethane and dichlorodifluoromethane is about 60%. In this specification and appended claims, the expression "total volatile matter" designates the total weight of 1,1,1-difluorochloroethane and dichlorodifluoromethane. When making up a composition containing about 76% 1,1,1-difluorochloroethane, the dichlorodifluoromethane content may be reduced to as low as about 5%, in which case the trichlorofluoromethane content is about 19%, the proportioning of ingredients in this circumstance being such as to provide a product having at 70° F. a vapor pressure of the order of 31–32 p. s. i. g., and a total volatile matter content of 1,1,1-difluorochloroethane and dichlorodifluoromethane of about 81%.

In accordance with the invention it has been found that when 1,1,1-difluorochloroethane, dichlorodifluoromethane and trichlorofluoromethane are utilized in quantities lying within the stated ranges and when the amounts of 1,1,1-difluorochloroethane and trichlorofluoromethane are chosen, within the indicated ranges, so that the resulting composition has a total volatile matter content of 1,1,1-difluorochloroethane and dichlorodifluoromethane of not less than about 40% and not more than about 95% by weight, there are formed compositions having a vapor pressure in the range of about 18–19 to about 40 p. s. i. g. at 70° F., and containing substantially greater amounts of volatile matter than do mixtures of dichlorodifluoromethane and trichlorofluoromethane having corresponding pressure values. Thus, for any given vapor pressure, the volatile matter contents of all products of the invention are substantially greater than, and in the preferred embodiment far in excess of, the volatile matter content of a mixture of trichlorofluoromethane and dichlorodifluoromethane having the same vapor pressure. It is noted that the total volatile matter content of products of the invention should not exceed about 95% in order to maintain vapor pressures at 70° F. about or below 40 p. s. i. g.

The diagram on the accompanying drawing illustrates composition-vapor pressure at 70° F. relationships of products falling within the scope of the invention. Diagonal lines 1, 2, 3, 4, 5, and 6 indicate compositions respectively containing 15%, 20%, 30%, 40%, 50%, and 76% by weight of 1,1,1-difluorochloroethane. While the variable range of dichlorodifluoromethane content is designated, the amounts of trichlorofluoromethane contained in the compositions are not shown, since such amounts are the difference between 100% and the percent sum of 1,1,1-difluorochloroethane and dichlorodifluoromethane.

Compositions thus far described may be diagrammatically denoted as lying within the area bounded by the straight lines connecting the points 10—11—12—17—18—10. All compositions between lines 1 and 6 contain 1,1,1-difluorochloroethane in amount ranging from about 15% to about 76% by weight, and all such compositions lying to the left of the vertical passing thru the 10 and to the right of vertical line 12—17 contain dichlorodifluoromethane in the range of 45-5% by weight. It will be observed that the specific composition indicated at 11 contains about 15% 1,1,1-difluorochloroethane and about 25% dichlorodifluoromethane, the total volatile matter content being the sum of the two, i. e. 40%. Similarly, e. g. the specific composition at 16, contains about 30% 1,1,1-difluorochloroethane and about 10% dichlorodifluoromethane, and has a total volatile matter content of about 40%. Thus, all compositions lying above line 11—12 contain not less than about 40% by weight of volatile matter. The particular composition at 18 contains about 76% 1,1,1-difluorochloroethane and about 19% dichlorodifluoromethane, and accordingly has a volatile matter content of about 95%, which value as previously noted should not be exceeded in order to maintain vapor pressure at 70° F. not significantly above 40 p. s. i. g. As shown, all of the products thus far described have vapor pressures at 70° F. in the range of about 18-19 to about 40 p. s. i. g.

Depending upon the desired 70° F. vapor pressure of any particular sought-for product falling within the broader aspects of the invention, the composition of such product may be determined and made up obviously by inspection and interpolation of the chart.

Since an important feature of the invention lies in provision of relatively high volatile matter content compositions, it is desirable in the formulation of the improved products to utilize amounts of 1,1,1-difluorochloroethane and dichlorodifluoromethane within the outside ranges denoted such that the resulting compositions have a total volatile matter content of 1,1,1-difluorochloroethane and dichlorodifluoromethane of not less than 55% and not more than 95% by weight. Referring again to the drawing, the specific product indicated at 20 contains about 15% 1,1,1-difluorochloroethane and about 40% dichlorodifluoromethane, the total volatile matter content being about 55%. The specific product at 13 contains about 50% 1,1,1-difluorochloroethane and about 5% dichlorodifluoromethane, the total volatile matter content again being about 55%. Hence, it will be understood that all products lying on and above the line 13—20 contain by weight a total volatile matter content of 1,1,1-difluorochloroethane and dichlorodifluoromethane of not less than about 55%. Similarly, as before stated in connection with the specific product denoted at 18, all products on and above line 13—20 have a total volatile matter content up to about 95% by weight. All of the products of this group have vapor pressures at 70° F. in the range of about 23-24 to about 40 p. s. i. g.

In some circumstances it is preferable to employ higher minimum amounts of 1,1,1-difluorochloroethane, desirably in the weight range of 30-76%. In this instance, where it is desired to formulate products having a total volatile matter content in the range of about 40-95%, and provide compositions having a vapor pressure in the range of about 18-19 to 40 p. s. i. g. at 70° F., the appropriate dichlorodifluoromethane range is changed to a maximum of about 38% and, as the 1,1,1-difluorochloroethane content increases to about 76%, the dichlorodifluoromethane content decreases progressively to about 5%. Hence, the particular product at 22 contains by weight about 30% 1,1,1-difluorochloroethane and about 38% dichlorodifluoromethane, total volatile matter content being about 68%. The specific product at 16 contains about 30% 1,1,1-difluorochloroethane and about 10% dichlorodifluoromethane, the total volatile matter content being about 40%. In the case of products of compositions presently under discussion, i. e. those lying within the area bounded by straight lines connecting points 22—16—12—17—18—22, it will be noted that all such products lying above line 12—16—11 have total volatile matter contents of about 40% or more and, similarly as stated in previous discussion with reference to point 18, a maximum volatile matter content of about 95% by weight. Further, all such products lie within the boundaries of vertical line 12—17, and the vertical line passing thru point 22 which denotes a dichlorodifluoromethane content of about 38%. Hence, all products of the type now being described have a dichlorodifluoromethane content in the range of 38-5% by weight.

In some cases, it may be desirable to form products similar to those discussed just above and having a 1,1,1-difluorochloroethane content in the 15-76% range but having a minimum total volatile matter content of not less than 60% by weight. Thus, the product at 10 contains about 15% difluorochloroethane and about 45% difluorodichloromethane, and the product at 25 contains about 30% 1,1,1-difluorochloroethane and about 30% dichlorodifluoromethane, each product having a total volatile matter content of about 60%. The particular product at 26 contains about 50% 1,1,1-difluorochloroethane and about 10% dichlorodifluoromethane, a total volatile matter content of about 60%. Accordingly, all products lying on and above the line 10—27 contain not less than about 60% by weight of volatile matter. The products in this group have vapor pressures at 70° F. in the range of the order of 25-26 to about 40 p. s. i. g., contain about 15% to about 76% 1,1,1-difluorochloroethane, about 45% to about 5% dichlorodifluoromethane, have a total volatile matter content of 1,1,1-difluorochloroethane and dichlorodifluoromethane of not less than about 60% and not more than about 95% by weight, and lie within the area denoted by the lines 10—25—26—27—17—18—10.

A preferred group of products, similar to those discussed just above, have a 1,1,1-difluorochloroethane content of about 50% and more up to about 76%, and have a minimum volatile matter content of not less than 60% by weight. Thus, the product at 14 contains about 50% 1,1,1-difluorochloroethane and about 30% dichlorodifluoromethane, a total volatile matter content of about 80%. The particular product at 26 contains about 50% 1,1,1-difluorochloroethane and about 10% dichlorodifluoromethane, a total volatile matter content of about 60%. The product at 27 contains about 55% difluorochloroethane and about 5% difluorodichloromethane. As above indicated, all products lying on and above the line 10—25—16—27 contain not less than about 60% by weight of volatile matter. The products of this particularly preferred group have vapor pressures at 70° F. in the range of the order of 25-26 to about 40 p. s. i. g., contain about 50% to about 76% 1,1,1-difluorochloroethane, about 30% to about 5% dichlorodifluoromethane, have a total volatile matter content of 1,1,1-difluorochloroethane and dichlorodifluoromethane of not less than about 60% and not more than about 95% by weight, and lie within the area denoted by the straight lines 14—26—27—17—18—14.

One preferred specific product of the immediately foregoing group has a vapor pressure of about 38-39 p. s. i. g. at 70° F., contains about 76% 1,1,1-difluorochloroethane, about 16% dichlorodifluoromethane, and about 8% trichlorofluoromethane. This product has a total volatile matter content of 1,1,1-difluorochloroethane and dichlorodifluoromethane of about 92% by weight, has a specific gravity of about 1.16 at 70° C., and such product is indicated on the chart approximately at 28.

A further preferred group of products, having a high 1,1,1-difluorochloroethane content, have a vapor pressure in the range of about 26 to about 37 p. s. i. g. at 70° F. and contain about 50% by weight of 1,1,1-difluorochloroethane. The particular product denoted at 26 contains about 50% 1,1,1-difluorochloroethane and about 10% dichlorodifluoromethane, has a total volatile matter content of about 60%, and a vapor pressure of the order of 26-27 p. s. i. g. at 70° F. Similarly, the specific product indicated at about 40 has a vapor pressure of the order of 36-37 p. s. i. g. at 70° F., contains about 50% 1,1,1-difluorochloroethane and about 25% dichlorodifluoromethane, a total volatile matter content of about 75%. The products of this preferred group all lie on that portion of diagonal line 5 within the approximate points designated by 26 and 40. Hence, all such products have a vapor pressure in the range of about 26 to about 37 p. s. i. g. at 70° F., contain about 50% 1,1,1-difluorochloroethane, about 10-25% dichlorodifluoromethane, and about 40-25% trichlorofluoromethane. Further, these compositions have a total volatile matter content of 1,1,1-difluorochloroethane and dichlorodifluoromethane not less than about 60% and not more than about 75% by weight.

One specific preferred product of the immediately foregoing group has a vapor pressure of about 26-27 p. s. i. g. at 70° F., contains about 50% 1,1,1-difluorochloroethane, about 10% dichlorodifluoromethane and about 40% trichlorofluoromethane, this material having a total volatile matter content of 1,1,1-difluorochloroethane and dichlorodifluoromethane of about 60% by weight. Such a product is indicated on the chart approximately at 26. Another preferred specific product of this group has a vapor pressure of about 36-37 p. s. i. g. at 70° F., contains about 50% 1,1,1-difluorochloroethane, about 25% dichlorodifluoromethane, and about 25% trichlorofluoromethane. This product has a total volatile matter content of 1,1,1-difluorochloroethane and dichlorodifluoromethane of about 75% by weight, and such product is indicated on the chart approximately at 40.

In other situations, it is preferable to form products having vapor pressure in the range of about 31 to about 40 p. s. i. g. at 70° F., and containing 1,1,1-difluorochloroethane in the range of about 15% to about 76% by weight. The product at 10 contains about 15% by weight of 1,1,1-difluorochloroethane, and about 45% of dichlorodifluoromethane, a total volatile matter content of about 60%. The particular product at 35 contains about 15% 1,1,1-difluorochloroethane and about 32% dichlorodifluoromethane, i. e. total volatile matter of about 47%, and the product at 17 contains about 76% 1,1,1-difluorochloroethane and about 5% dichlorodifluoromethane, a total of 81% volatile matter. Hence, all products above line 35—17 contain not less than about 47% total volatile matter. It will be seen that this instantly discussed group of products, lying in the area of lines 10—35—17—18—10, all contain about 15-76% 1,1,1-difluorochloroethane, about 47-5% dichlorodifluoromethane, and have a total volatile matter content of not less than about 47% and not more than about 95% by weight.

Other formulations falling within the scope of the invention are as follows.

Improved dispersant compositions may contain by weight not less than above 15% and up to about 50% of 1,1,1-difluorochloroethane, not more than 45% and down to about 5% of dichlorodifluoromethane, the remainder, to provide a 100% composition, being trichlorofluoromethane.

Such compositions may be diagrammatically denoted as lying substantially within the area bounded by the straight lines connecting the points 10—11—12—13—14—10. All compositions between line 1 and just short of line 5 contain 1,1,1-difluorochloroethane in amount ranging from about 15% up to about 50% by weight, and all such compositions lying to the left of the vertical passing thru the 10 and to the right of vertical line 12—13 contain dichlorodifluoromethane in the range of about 45% down to about 5% by weight. As previously noted, all compositions lying on and above line 11—12 contain not less than about 40% by weight of volatile matter. The particular composition slightly to the right of 14 contains just short of 50%, 1,1,1-difluorochloroethane and a little more than 30% dichlorodifluoromethane, and accordingly has a volatile matter content a little less than 80%. As shown, all of the products of this group have vapor pressures at 70° F. in the range of about 18-19 to about 40 p. s. i. g.

As previously explained, all products lying on and above line 20—13 have a total volatile matter content of about 55% or more. Hence, products lying substantially within the area bounded by the lines 10—20—13—14—10 contain by weight about 15% up to just short of 50% 1,1,1-difluorochloroethane, about 45% down to about 5% dichlorodifluoromethane, have a total volatile matter content of 1,1,1-difluorochloroethane and dichlorodifluoromethane of not less than about 55% and up to about 80% by weight, and have vapor pressures at 70° F. in the range of about 23-24 to about 40 p. s. i. g. Further, as noted above, all products lying on and above line 10—25—26 have a total volatile matter content of about 60% or more. Hence, products lying substantially within the area bounded by the lines 10—25—26—14—10 contain by weight about 15% up to about 50% 1,1,1-difluorochloroethane, about 45% down to a little more than 10% dichlorodifluoromethane, have a total volatile matter content of 1,1,1-difluorochloroethane and dichlorodifluoromethane of not less than about 60% and up to about 80% by weight, and have vapor pressures at 70° F. in the range of about 26-27 to about 40 p. s. i. g.

In other situations, it may be desirable to form products having vapor pressure in the range of about 30 to about 40 p. s. i. g. at 70° F., and containing 1,1,1-difluorochloroethane in the range of about 15% up to about 50% by weight. As above noted, the specific product at 10 contains about 15% by weight of 1,1,1-difluorochloroethane, and about 45% of dichlorodifluoromethane, a total volatile matter content of about 60%. The particular product at 32 contains about 15% 1,1,1-difluorochloroethane and about 30% dichlorodifluoromethane, i. e. total volatile matter of about 45%, and the product at about 33 contains just short of 50% 1,1,1-difluorochloroethane and a little more than 15% dichlorodifluoromethane, a total of a little less than 65% volatile matter. Hence, all products on and above line 32—33 contain not less than about 45% total volatile matter. It will be seen that this instantly discussed group of products, lying substantially in the area of lines 10—32—33—14—10, all contain about 15% up to about 50% 1,1,1-difluorochloroethane, about 45% down to about 15% dichlorodifluoromethane, and have a total volatile matter content of not less than about 45% and up to about 80% by weight.

Diagonal line 45 on the drawing represents the composition-vapor pressure at 70° F. relationship of various prior art mixtures of dichlorodifluoromethane and trichlorofluoromethane. A comparison of diagonal line 45 with any of lines 1, 2, 3, 4, 5 or 6 shows that the incorporation into a mixture of dichlorodifluoromethane and trichlorofluoromethane of any amount of 1,1,1-difluorochloroethane provides a low pressure dispersant which has, for any given or required 70° F. vapor pressure, a higher volatile matter content than the volatile matter content of mixtures of dichlorodifluoromethane and trichlorofluoromethane having the same 70° F. vapor pressure value. Hence, at a 70° F. vapor pressure of about 25 p. s. i. g., a dichlorodifluoromethane trichlorofluoromethane mixture has a volatile matter content (dichlorodifluoromethane) of about 35%. At the same vapor pressure, a product of the invention containing for example 30% 1,1,1-difluorochloroethane (diagonal line 3 on the drawing) contains approximately 15% dichlorodifluoromethane, and consequently has a total volatile matter content of 45%, as compared with the 35% value of the dichlorodifluoromethane-trichlorofluoromethane mixture. At the same vapor pressure, a product of the invention containing about 50%, 1,1,1-difluorochloroethane contains about 7% dichlorodifluoromethane, and hence has a total volatile matter content of about 57% as compared with the 35% value of the dichlorodifluoromethane - trichlorofluoromethane mixture. At a 70° F. vapor pressure of about 35 p. s. i. g., a mixture of dichlorodifluoromethane and trichlorofluoromethane contains about 50% by weight of dichlorodifluoromethane and hence a volatile matter content of about 50% by weight. At the same vapor pressure, the 30% 1,1,1-difluorochloroethane composition of the invention (diagonal line 3 on the drawing) contains about 31% dichlorodifluoromethane, and consequently has a total volatile matter content of about 61%. At a 70° F. vapor pressure of about 38 p. s. i. g., the 76% 1,1,1-difluorochloroethane product of the invention (diagonal line 6 on the drawing) contains about 16% dichlorodifluoromethane, has a total volatile matter content of about 92%, the total volatile matter content of the dichlorodifluoromethane - trichlorofluoromethane mixture of the same pressure being less than about 55%. A further advantage applicable to all products of the invention, arising from the incorporation of 1,1,1-difluorochloroethane is that in view of its low specific gravity, mixtures containing the same possess relatively large volumes per given weight as compared with the volumes of mixtures of dichlorodifluoromethane and trichlorofluoromethane which do not contain any of the 1,1,1-difluorochloroethane.

This application is a continuation-in-part of my U. S. application Serial No. 793,418, filed December 23, 1947, now abandoned.

I claim:

1. A non-flammable, non-toxic liquid composition, adapted for use as a dispersant, having a vapor pressure in the range of about 18 to about 40 p. s. i. g. at 70° F., and consisting of 1,1,1-difluorochloroethane, dichlorodifluoromethane, and trichlorofluoromethane; said composition containing by weight about 15% to about 76% 1,1,1-difluorochloroethane, about 45% to about 5% dichlorodifluoromethane, the remainder being trichlorofluoromethane; the amounts of 1,1,1-difluorochloroethane and dichlorodifluoromethane being such that said composition has a total volatile matter content of 1,1,1-difluorochloroethane and dichlorodifluoromethane of not less than about 40% and not more than about 95% by weight, said composition being maintained under sufficient pressure in a confined space to keep it in the liquid phase.

2. A non-flammable, non-toxic liquid composition, adapted for use as a dispersant, having a vapor pressure in the range of about 23 to about 40 p. s. i. g. at 70° F., and consisting of 1,1,1-difluorochloroethane, dichlorodifluoromethane, and trichlorofluoromethane; said composition containing by weight about 15% to about 76% 1,1,1-difluorochloroethane, about 45% to about 5% dichlorodifluoromethane, the remainder being trichlorofluoromethane; the amounts of 1,1,1-difluorochloroethane and dichlorodifluoromethane being such that said composition has a total volatile matter content of 1,1,1-difluorochloroethane and dichlorodifluoromethane of not less than about 55% and not more than about 95% by weight, said composition being maintained under sufficient pressure in a confined space to keep it in the liquid phase.

3. A non-flammable, non-toxic liquid composition, adapted for use as a dispersant, having a vapor pressure in the range of about 25 to about 40 p. s. i. g. at 70° F., and consisting of 1,1,1-difluorochloroethane, dichlorodifluoromethane, and trichlorofluoromethane; said composition contained by weight about 50 to about 76% 1,1,1-difluorochloroethane, about 30% to about 5% dichlorodifluoromethane, the remainder being trichlorofluoromethane; the amounts of 1,1,1-difluorochloroethane and dichlorodifluoromethane being such that said composition has a total volatile matter content of 1,1,1-difluorochloroethane and dichlorodifluoromethane of not less than about 60% and not more than about 95% by weight, said composition being maintained under sufficient pressure in a confined space to keep it in the liquid phase.

4. A non-flammable, non-toxic liquid composition, adapted for use as a dispersant, having a vapor pressure in the range of about 18 to about 40 p. s. i. g. at 70° F., and consisting of 1,1,1-difluorochloroethane, dichlorodifluoromethane, and trichlorofluoromethane; said composition containing by weight about 15% up to about 50% 1,1,1-difluorochloroethane, about 45% down to about 5% dichlorodifluoromethane, the remainder being trichlorofluoromethane; the amounts of 1,1,1-difluorochloroethane and dichlorodifluoromethane being such that said composition has a total volatile matter content of 1,1,1-difluorochloroethane and dichlorodifluoromethane of not less than about 40% and up to about 80% by weight, said composition being maintained under sufficient pressure in a confined space to keep it in the liquid phase.

5. A non-flammable, non-toxic liquid composition, adapted for use as a dispersant, having a vapor pressure in the range of about 26 to about 37 p. s. i. g. at 70° F., and consisting of 1,1,1-difluorochloroethane, dichlorodifluoromethane, and trichlorofluoromethane; said composition containing by weight about 50% 1,1,1-difluorochloroethane, about 10% to about 25% dichlorodifluoromethane, and about 40% to about 25% trichlorofluoromethane; the amounts of 1,1,1-difluorochloroethane and dichlorodifluoromethane being such that said composition has a total volatile matter content of 1,1,1-difluorochloroethane and dichlorodifluoromethane of not less than about 60% and not more than about 75% by weight, said composition being maintained under sufficient pressure in a confined space to keep it in the liquid phase.

6. A non-flammable, non-toxic liquid composition, adapted for use as a dispersant, having a vapor pressure in the range of about 26–27 p. s. i. g. at 70° F., and consisting of 1,1,1-difluorochloroethane, dichlorodifluoromethane, and trichlorofluoromethane; said composition containing by weight about 50% 1,1,1-difluorochloroethane, about 10% dichlorodifluoromethane, and about 40% trichlorofluoromethane; the said composition having a total volatile matter content of 1,1,1-difluorochloroethane and dichlorodifluoromethane of about 60% by weight and being maintained under sufficient pressure in a confined space to keep it in the liquid phase.

7. A non-flammable, non-toxic liquid composition, adapted for use as a dispersant, having a vapor pressure in the range of about 36–37 p. s. i. g. at 70° F., and consisting of 1,1,1-difluorochloroethane, dichlorodifluoromethane, and trichlorofluoromethane; said composition containing by weight about 50% 1,1,1-difluorochloroethane, about 25% dichlorodifluoromethane, and about 25% trichlorofluoromethane; the said composition having a total volatile matter content of 1,1,1-difluorochloroethane and dichlorodifluoromethane of about 75% by weight and being maintained under sufficient pressure in a confined space to keep it in the liquid phase.

8. A non-flammable, non-toxic liquid composition, adapted for use as a dispersant, having a vapor pressure in the range of about 38–39 p. s. i. g. at 70° F., and consisting of 1,1,1-difluorochloroethane, dichlorodifluoromethane, and trichlorofluoromethane; said composition containing by weight about 76% 1,1,1-difluorochloroethane, about 16% dichlorodifluoromethane, and about 8% trichlorofluoromethane; the said composition having a total volatile matter content of 1,1,1-difluorochloroethane and dichlorodifluoromethane of about 92% by weight and being maintained under sufficient pressure in a confined space to keep it in the liquid phase.

FREDERICK G. LODES.

REFERENCES CITED

The following references are of record in the file of this patent:

Journal Am. Chem. Soc., June 1936, pp. 889 and 890.

Soap and Sanitary Chemicals, April 1945, vol. 21, No. 4, pp. 123, 125 and 127.

Committee of Medical Research of the Office of Scientific Research and Development Bimonthly Progress Report No. 25, Section 2, period ending August 31, 1945, available from Office of Technical Services, Aug. 12, 1946, subject: Research on Insects Affecting the Armed Forces, Contract No. OEMcmr-M-4331, page 3.

Soap and Sanitary Chemicals, Dec. 1946, vol. 22, pp 137.